(12) United States Patent
Bang et al.

(10) Patent No.: US 12,056,004 B2
(45) Date of Patent: Aug. 6, 2024

(54) METHOD AND APPARATUS WITH COSMIC RAY FAULT PROTECTION

(71) Applicant: Samsung Electronics Co., Ltd., Suwon-si (KR)

(72) Inventors: Byungwoo Bang, Seoul (KR); Seongbeom Kim, Anyang-si (KR); Uiseok Song, Suwon-si (KR); Jaehyung Ahn, Suwon-si (KR); Junyeon Lee, Seoul (KR); Wooseok Chang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/881,793

(22) Filed: Aug. 5, 2022

(65) Prior Publication Data

US 2023/0076106 A1    Mar. 9, 2023

(30) Foreign Application Priority Data

Sep. 2, 2021    (KR) .................. 10-2021-0116914

(51) Int. Cl.
  *G06F 11/00*  (2006.01)
  *G06F 1/30*  (2006.01)
  *G06F 11/07*  (2006.01)
(52) U.S. Cl.
  CPC ............ *G06F 11/0793* (2013.01); *G06F 1/30* (2013.01); *G06F 11/0796* (2013.01)
(58) Field of Classification Search
  CPC .................... G06F 11/002; G06F 11/0796
  See application file for complete search history.

(56) References Cited

U.S. PATENT DOCUMENTS

| | | | |
|---|---|---|---|
| 5,999,465 A | 12/1999 | Shabde et al. | |
| 6,901,532 B2 * | 5/2005 | DeRuiter | G11C 11/4125 714/49 |
| 7,689,814 B2 * | 3/2010 | Okawa | G06F 11/004 712/227 |
| 9,250,827 B2 | 2/2016 | Beveridge | |

(Continued)

FOREIGN PATENT DOCUMENTS

| | | |
|---|---|---|
| CN | 101751501 A | 6/2010 |
| CN | 103810368 A | 5/2014 |

(Continued)

OTHER PUBLICATIONS

Nwankwo, V. U. et al. "The impact of space radiation environment on satellites operation in near-Earth space." *Satellites Missions and Technologies for Geosciences*. Edited Volume (2020). pp. 1-27.

(Continued)

*Primary Examiner* — Amine Riad
(74) *Attorney, Agent, or Firm* — NSIP Law

(57) ABSTRACT

A method and apparatus with cosmic ray fault protection is included. A method includes obtaining cosmic ray information indicating at least one cosmic ray event, determining a soft error mitigation policy based on the cosmic ray information, accessing the soft error mitigation policy by a device, and based on the soft error mitigation policy, performing, by the device, a mitigation action that mitigates for soft errors related to the cosmic ray event.

25 Claims, 6 Drawing Sheets

(56) References Cited

U.S. PATENT DOCUMENTS

| | | | |
|---|---|---|---|
| 10,608,871 B2* | 3/2020 | Yu | H04L 41/0897 |
| 11,314,579 B2* | 4/2022 | Ramasamy | H04L 67/10 |
| 2016/0065243 A1* | 3/2016 | Patterson | G06F 9/30145 |
| | | | 714/752 |

FOREIGN PATENT DOCUMENTS

| | | |
|---|---|---|
| CN | 104143036 A | 11/2014 |
| KR | 10-1341231 B1 | 12/2013 |
| WO | WO 98/02887 A1 | 1/1998 |

OTHER PUBLICATIONS

Keller, Andrew M. et al. "Terrestrial Cosmic Ray Induced Soft Errors and Large-Scale FPGA Systems in the Cloud." (2019). pp. 1-8.

Sarangi, Smruti R. "Soft Errors: A curse from the heavens." Department of Computer Science Indian Institute of Technology New Delhi, India. pp. 1-47.

* cited by examiner

METHOD AND APPARATUS WITH COSMIC RAY FAULT PROTECTION

CROSS-REFERENCE TO RELATED APPLICATIONS

This application claims the benefit under 35 USC § 119(a) of Korean Patent Application No. 10-2021-0116914, filed on Sep. 2, 2021, in the Korean Intellectual Property Office, the entire disclosure of which is incorporated herein by reference for all purposes.

BACKGROUND

1. Field

The following description relates to a method and apparatus with cosmic ray fault protection.

2. Description of Related Art

Cosmic rays may cause a variety of issues in a device's components, for example a central processing unit (CPU), a dynamic random-access memory (DRAM), a storage, or the like. That is, a device may experience hardware or software errors caused by cosmic rays arriving from Space or other stray interference.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes obtaining cosmic ray information indicating at least one cosmic ray event, determining a soft error mitigation policy based on the cosmic ray information, accessing the soft error mitigation policy by a device, and based on the soft error mitigation policy, performing, by the device, a mitigation action that mitigates for soft errors related to the cosmic ray event.

The determining of the soft error mitigation policy may include determining a mean time between failure (MTBF) of the device based on the cosmic ray information, and performing a checkpoint of the device based on the MTBF.

The determining of the MTBF may include receiving a first MTBF of the device, and
generating the MTBF of the device based on the cosmic ray information and the first MTBF.

The mitigation action may include modifying power supplied to the device based on the cosmic ray information.

The mitigation action may include changing an operating mode of the device.

The obtaining the cosmic ray information may include obtaining observation data obtained by a sensor, the observation data predictive of the cosmic ray event, and predicting the cosmic ray event by inputting the observation data to an artificial neural network (ANN).

The predicting of the cosmic ray information may include correcting or generating an output of the ANN based on location information of the device and/or location information of the cosmic ray event.

The predicting of the cosmic ray information includes predicting an energy, intensity, or flux level of the cosmic ray event according to the location information of the device, and predicting a time and/or duration of the cosmic ray event according to the location information of the device.

The obtaining of the cosmic ray information may include receiving the cosmic ray information via a network.

The mitigation action may include one or more of: performing a checkpoint, modifying power provided to or consumed by the device, altering hardware used by the device, or changing an operation mode of the device.

The cosmic ray information may be based on cosmic ray data obtained by sensing particles or electromagnetic radiation from Space, and the particles or electromagnetic radiation are associated with the cosmic ray event.

In one general aspect, an apparatus includes a processor configured to obtain information about aa predicted cosmic ray event, determine a soft error mitigation policy based on the predicted cosmic ray event, and configure a device to perform a mitigation action based on the soft error mitigation policy.

The processor may be further configured to determine a mean time between failure (MTBF) of the device based on the information about the predicted cosmic ray event and determine a checkpoint cycle of the device based on the MTBF.

The processor may be further configured to generate the MTBF based on a first MTBF of the device and based on the information about the predicted cosmic ray event.

The processor may be further configured to modify a voltage supplied to or consumed by the device based on the information about the predicted cosmic ray event.

The processor may be further configured to determine an operating mode of the device based on the information about the predicted cosmic ray event.

The processor may be further configured to obtain observational data related to the predicted cosmic ray event and generate the information about the predicted cosmic ray event by inputting the observational data to an artificial neural network (ANN).

The processor may be further configured to modify an output of the ANN based on location information of the device.

The processor may be further configured to predict an energy, intensity, or flux level of the predicted cosmic ray event according to a location of the device, predict a duration of the predicted cosmic ray event according to the location of the device, and predict a time-to-arrive of the event according to the location of the device.

The processor may be further configured to receive the information about the predicted cosmic ray event.

In one general aspect, a method is performed by one or more computing devices. The method includes receiving cosmic ray data obtained based on sensing particles or electromagnetic radiation from Space, wherein the particles or electromagnetic radiation are associated with a future cosmic ray event, determining a mitigation action based on the cosmic ray data, and implementing, by at least one of the one or more computing devices, the mitigation action.

The method may further include generating prediction data of the cosmic ray event and determining the mitigation action based on the prediction data of the cosmic ray even.

The prediction data may include a predicted timing, location, duration, and/or intensity of the cosmic ray event with respect to at least one of the computing devices.

The generating the prediction data of the cosmic ray event may be performed at least in part by an ANN.

The determining a timing and/or duration of the mitigation action may be based on the cosmic ray data, and the performing the mitigation action may be according to the timing and/or duration of the mitigation action.

The determining the mitigation action may be further based on a location of the at least one of the computing devices.

The receiving and determining may be performed by the at least one of the one or more computing devices.

The at least one of the one or more computing devices may comprise a satellite.

In one general aspect, a non-transitory computer-readable storage medium stores instructions that, when executed by a processor, cause the processor to perform any of the methods.

In one general aspect,

Other features and aspects will be apparent from the following detailed description, the drawings, and the claims.

Figure 1:
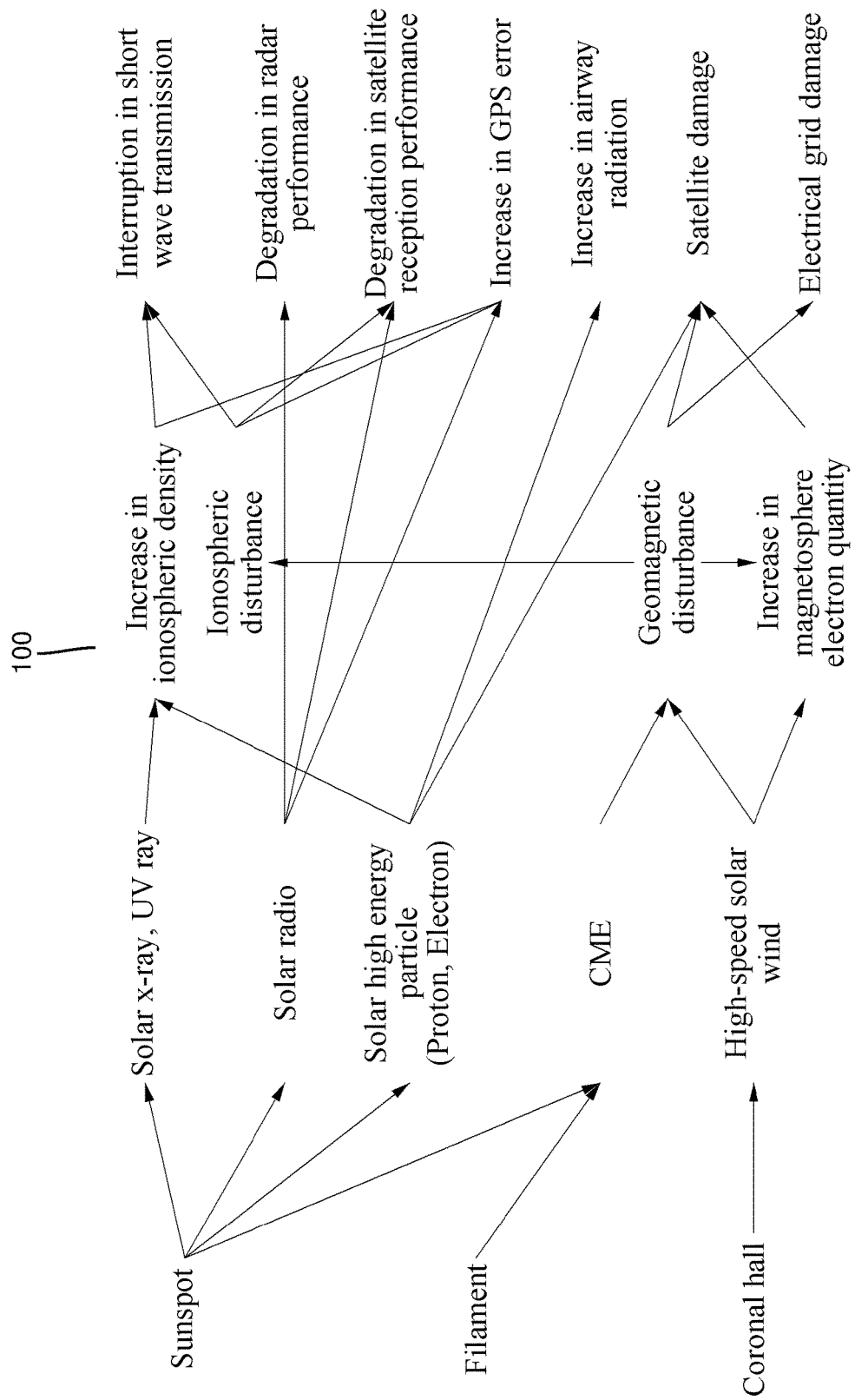
FIG. 1 illustrates examples of events that may be caused by a cosmic ray, according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "The" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates examples of events 100 that may be caused by a cosmic ray event, according to one or more embodiments. A cosmic ray is a generic term for any of various particles or electromagnetic radiation with diverse types of energy (often high-energy). As cosmic ray protons, for example, descend to the ground, the protons decay into pion mesons, and the mesons may further decay into muon particles with a lower mass to form electrons (or positrons), neutrinos, photons, and the like. A cosmic ray may be a galactic cosmic ray or a solar cosmic ray. Hereinafter, for convenience of description, a solar cosmic ray will be described, although all types of cosmic rays are applicable.

Referring to the left side of FIG. 1, a cosmic ray may occur due to various solar activities (e.g., a flare, solar proton events, coronal mass ejections, or high-speed solar wind). If a device is exposed to a cosmic ray, various events that cause soft errors may occur, as shown on the left side of FIG. 1. For example, if a powerful sunspot explosion occurs, light such as x-rays and ultraviolet (UV) rays may reach the earth in about eight minutes, which may cause an event of interruption in short wave transmission and degradation in satellite reception performance of the device.

The rate and risk of solar cosmic rays may change significantly due to changing solar activities. For example, when a coronal mass ejection occurs due to a sunspot, a magnitude of the coronal mass ejection during a solar maximum may be fifty times what would occur during a solar minimum. Due to the types of significant of solar disturbances shown in FIG. 1, problems caused by resulting soft errors may increase.

In particular, supercomputers have consistently increased in size to solve problems requiring massive computation power. For example, the number of nodes in supercomputers continues to increase. The number of nodes has progressed from a few hundred to hundreds of thousands. However, as the number of nodes increases, the likelihood of problems caused by a soft error may also increase, and a program (e.g., a long-running simulation performed by execution of machine instructions) may not be completed if a soft error occurs unexpectedly during its execution.

Hereinafter, methods that may help to minimize soft errors caused by cosmic rays will be described in detail with reference to FIGS. 2 through 5.

Figure 2:
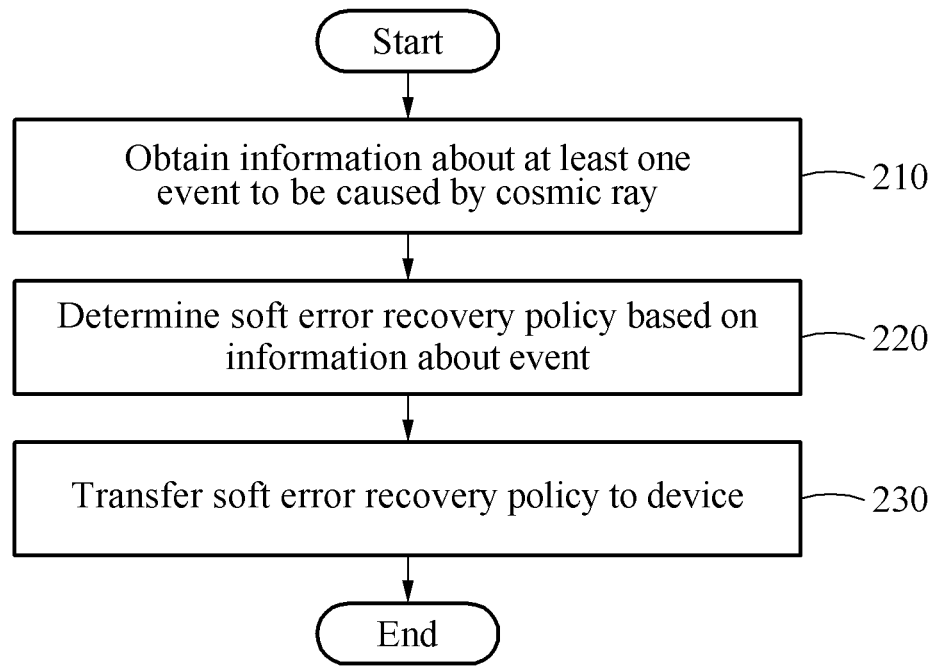
FIG. 2 illustrates an example of enhancing device fault protection, according to one or more embodiments.

FIG. 2 illustrates an example of enhancing device fault protection, according to one or more embodiments. Referring to FIG. 2, operations 210, 220, and 230 may be performed by an apparatus for enhancing device fault protection. The apparatus for enhancing device fault protection may be implemented by one or more hardware modules, one or more software modules (in the form of processor-executable instructions) in combination with processing hardware, or various combinations thereof, as further described below.

Operations 210 to 230 may be performed in the order and manner illustrated in FIG. 2, but the order of some operations may be changed or some operations may be omitted without departing from the spirit and scope of the examples. Operations 210 to 230 may be performed in parallel or concurrently.

In operation 210, the apparatus for enhancing device fault protection may obtain information about at least one event that may be caused by cosmic rays (a cosmic ray event). The apparatus for enhancing device fault protection may receive the information (i.e., data related to the cosmic ray) to directly predict information about the cosmic ray event, or the apparatus may receive the information about the cosmic ray event from another entity (e.g., a space activity analyzer), which will be further described below.

The information about the cosmic ray event may include energy level information (e.g., energy, flux, and/or intensity) of the event, period information about a period of time during which the event occurs, and/or time-to-arrive information of the event (i.e., time and/or duration of an event according to a physical/observational measurement related to the event). Further, the information about the cosmic ray event may vary according to location. That is, the information about the event (or events) may include predictions of the other aspects of the event according to location. As used herein, the term "location", with respect to a target device and/or a cosmic ray event, refers to geographic locations (e.g., longitude, latitude, and possibly altitude), orbital locations (e.g., with respect to the Earth or the Sun), or any locations in Space. As will be discussed below, this may be helpful when used in combination with the location of a device that is the target of soft error mitigation. As noted, the location of the target device and the location of a specific cosmic ray event (or subevents) may be represented by latitudes and longitudes, Earth/Sun orbital location, general location in Space, etc.

The apparatus for enhancing device fault protection may obtain information about a cosmic ray event in the form of a table, for example. However, any structure of data may be used and other types of information about cosmic ray activity may be used. The information about a cosmic ray event may be received from a network-based reporting service (e.g., a cloud or web service), directly from a sensing system/platform, and so forth. Table 1 below shows an example of some of the types of information about a cosmic ray event that might be included in an event data report or message (i.e., information about a cosmic ray event).

TABLE 1

| Latitude | Longitude | High Energy Level (1~10) | Low Energy Level (1~10) | Duration (minutes) | Time to Arrive (minutes) |
|---|---|---|---|---|---|
| 37 | 127 | 8 | 5 | 6000 | 611 |
| 38 | 127 | 4 | 1 | 2000 | 9886 |
| 39 | 127 | 2 | 1 | 3000 | 1444 |
| 40 | 127 | 3 | 2 | 4000 | 3684 |
| 41 | 127 | 1 | 3 | 5000 | 4785 |
| 42 | 127 | 6 | 5 | 1000 | 257 |
| 43 | 127 | 7 | 1 | 3000 | 17135 |
| 44 | 127 | 2 | 2 | 2000 | 17530 |
| 37 | 128 | 1 | 1 | 500 | 2138 |
| 37 | 129 | 2 | 2 | 3000 | 2485 |
| 37 | 130 | 3 | 1 | 2000 | 7584 |
| 37 | 131 | 2 | 3 | 500 | 9471 |
| 37 | 132 | 1 | 2 | 3000 | 485 |
| 37 | 133 | 2 | 1 | 2000 | 17547 |
| 37 | 134 | 3 | 3 | 500 | 2647 |
| 37 | 135 | 1 | 2 | 500 | 569887 |

In operation 220, the apparatus for enhancing device fault protection may determine (e.g., select or generate) a soft error mitigation policy based on the information about the cosmic ray event. For example, the apparatus for enhancing device fault protection may determine a mean time between failure (MTBF) of the target device (to be protected) based on the information about the cosmic ray event and may determine, based on the MTBF, a corresponding mitigation step, for example a checkpoint cycle of the device may be selected. As another example, based on the event data, including possibly times, geographic locations, and/or durations of event hotspots, as well as location of the target device, failure of the device may be predicted, for example as a function of time and probability, which may serve as a basis for determining a time (and/or duration) and type of mitigation action. Other mitigations besides checkpointing may be used. For example, execution of an application may be shifted to portions of the application (or device) that are robust against soft errors (e.g., aggregated floating point operations), the device may be put into a suspended or low-power state, the application may be suspended and its data force-stored to non-volatile storage, hardware that lacks error-correction coding may be taken out of use, error-correction coding might be activated in hardware and/or or in the code of the application, a rate of regular checkpointing might be increased (e.g., from daily or hourly to every minute) and so forth.

To elaborate, in the case of using checkpointing to mitigate against soft errors, the checkpointing may involve any technique of storing context of the device, perhaps periodically, thus allowing recovery of the context when an unexpected system error occurs. Checkpointing may be done at the machine level. Checkpointing may be done by checkpointing virtual machines, by checkpointing storage used by the device (e.g., a storage service possibly provided by a local storage duster or a cloud storage service), by invoking (e.g., by a signal) the relevant software (computer-readable instructions) executing on the device (e.g., a simulation) to perform its own checkpoint (which might involve storing data and/or execution state to disk), by suspending or saving a process, and so forth.

The apparatus for enhancing device fault protection may store an intermediate state of a program by performing checkpointing at regular intervals to prepare against such errors predicted based on event data and may restart from the intermediate state even if an error occurs. In the case of periodic checkpointing, it may be helpful to determine a suitable checkpoint period based on system overhead and availability, storage capacity, etc. The apparatus for enhancing device fault protection may dynamically determine the soft error mitigation policy (e.g., mitigation action and/or timing/duration) by predicting a soft error that may be caused by a cosmic ray event and may thereby trigger a checkpoint, for example, outside of an existing regular checkpointing schedule.

In an example, a checkpoint period may be determined based on the MTBF of the device. The checkpoint period may be determined to be less than a baseline MTBF of the device. The MTBF may be the mean time between past failure occurrences. An MTBF for a given period may be calculated by dividing the total operating time in the given period by the total number of failures. For example, if 3 failures occur during 600 hours, the MTBF may be 200 (600/3).

An MTBF for a hardware error may not always suffice as such an MTBF might be calculated to approximate a failure rate of zero. In such a case, a checkpoint period determined based on an ordinary hardware-based MTBF may not be adequate for a situation where soft errors frequently occur, for example during cosmic interference. Accordingly, the apparatus for enhancing device fault protection may determine the MTBF to reflect predicted soft errors, and may determine a soft error mitigation policy, for example setting a checkpoint period based on the MTBF calculated based on information about cosmic interference.

The apparatus for enhancing device fault protection may receive (or generate) a first MTBF of the target device and modify the first MTBF of the device based on the information about the predicted cosmic ray event. The first MTBF may be a baseline MTBF, for example, an MTBF calculated based on hardware errors regardless of soft errors. The apparatus for enhancing device fault protection may use the first MTBF to determine a final MTBF that reflects information predictive of soft errors.

More specifically, the apparatus for enhancing device fault protection may obtain an MTBF table of the device that has been generated according to a stimulated or actual cosmic ray flux. For example, the soft error MTBF table of the device according to the cosmic ray flux may be prepared in advance through an acceleration test. The acceleration test may be an experiment that estimates how often a device will fail due to cosmic rays by artificially irradiating large amounts of neutrons and/or protons to the device. The apparatus for enhancing device fault protection may directly generate the soft error MTBF table through the acceleration test, or receive a soft error MTBF table generated from another device. Alternatively, the soft error MTBF table may be based on historical data of the target device. That is, historical cosmic interference may be compared to historical failures of the devices (or a proxy thereof). Another approach may be to model features of the device (e.g., a silicon footprint) to predict soft errors as a function of cosmic interference type, intensity, duration, etc. A soft error MTBF table may also be predicted for the device by a machine learning model trained with historical failure data of the device (and/or other devices) and historical cosmic event data for the same time(s) as the historical failure data. Any source of soft error MTBF data may be used.

When the soft error MTBF table is obtained or accessed, the apparatus for enhancing device fault protection may compute an MTBF corresponding to the information (e.g., information about a cosmic ray flux received at a current location of the device) about the event based on the soft error MTBF table.

For example, the apparatus for enhancing device fault protection may determine a checkpoint period based on the MTBF of the device computed based on the cosmic event data. If soft errors due to neutrons increase greatly, the checkpoint period may be changed to be shorter, e.g., an existing checkpoint period of once per 300 steps or phases, may be changed to a checkpoint period of once per 180 steps or phases.

In addition, the apparatus for enhancing device fault protection may determine a magnitude of a supply voltage applied to the device (or power consumption), based on the information about the cosmic ray event. The apparatus for enhancing device fault protection may raise the supply voltage applied to the device within an allowable voltage to prevent the device from being discharged when soft errors increase.

Further, for example, the apparatus for enhancing device fault protection may, for mitigation, in addition to or instead of changing a checkpoint schedule, determine an operating mode of the device based on the information about the event. Another example mitigation technique of the apparatus for enhancing device fault protection may be to include, in the policy, information that will instruct the device to change an operating mode from a performance mode to a reliability mode when soft errors are predicted to increase. In another example, the operating mode might be a low-power mode, a standby/sleep mode, a shutdown mode, a power-off mode, a mirroring mode, etc.

In operation 230, the apparatus for enhancing device fault protection may transfer the soft error mitigation policy to the target device (in some implementations the target device may itself perform the operations preceding operation 230). The device may be any of various types, such as a supercomputer, a PC, a laptop computer, a tablet computer, a smartphone, a TV, a smart home appliance, an intelligent vehicle, a kiosk, a wearable device, a satellite, etc. Hereinafter, for convenience of description, a supercomputer will be described. Note that the prediction and mitigation techniques described herein may also be performed by a computing device that includes the apparatus for enhancing device fault protection and the target device. That is, a single computing device (e.g., a supercomputer) may receive the event data, access the soft error MTBF table, and select its own mitigation action based thereon.

A supercomputer may be a massively parallel system cluster including a plurality of nodes and may include a job scheduler. The supercomputer may receive the soft error mitigation policy through the job scheduler. When the soft error mitigation policy is received, the supercomputer may transfer the soft error mitigation policy to each node. In an example, the supercomputer may determine, for each node, whether the node is currently operating. If a node is operating, the supercomputer may stop a normal job being currently performed and change a checkpoint period thereof, and if the node is not operating, the supercomputer may change the checkpoint period to be in effect when a job is performed later. In addition to or as an alternative to changing checkpointing behavior, the supercomputer may change a voltage condition (or other power condition), an operating mode, and/or the like, according to the soft error mitigation policy. For example, a supercomputer may increase a voltage applied to components in all nodes thereof.

The apparatus for enhancing device fault protection may determine whether to transfer the soft error mitigation policy relating to a corresponding event, by comparing a time to arrive of the event to a sum of a time used to obtain data related to the cosmic ray and a time used to predict information about the event.

For example, if it takes one day for solar wind to reach the device, eight minutes to observe an image of the solar wind, and fifteen minutes to analyze the image, it may be decided to transfer to the device a soft error mitigation policy due to the solar wind based on determining that the image observation and analysis are completed before the solar wind reaches the device. In other words, there may be a preliminary determination of whether a softer error mitigation policy will arrive at the device within a time sufficient for the device to take corresponding mitigative action before the device is exposed to the effect of the event.

On the contrary, if x-rays and UV rays are determined to reach the device in eight minutes due to a powerful sunspot explosion, a soft error mitigation policy relating to a corresponding event may not be transferred to the device because the x-rays and UV rays are determined to reach the device before image observation and analysis are completed.

Figure 3:
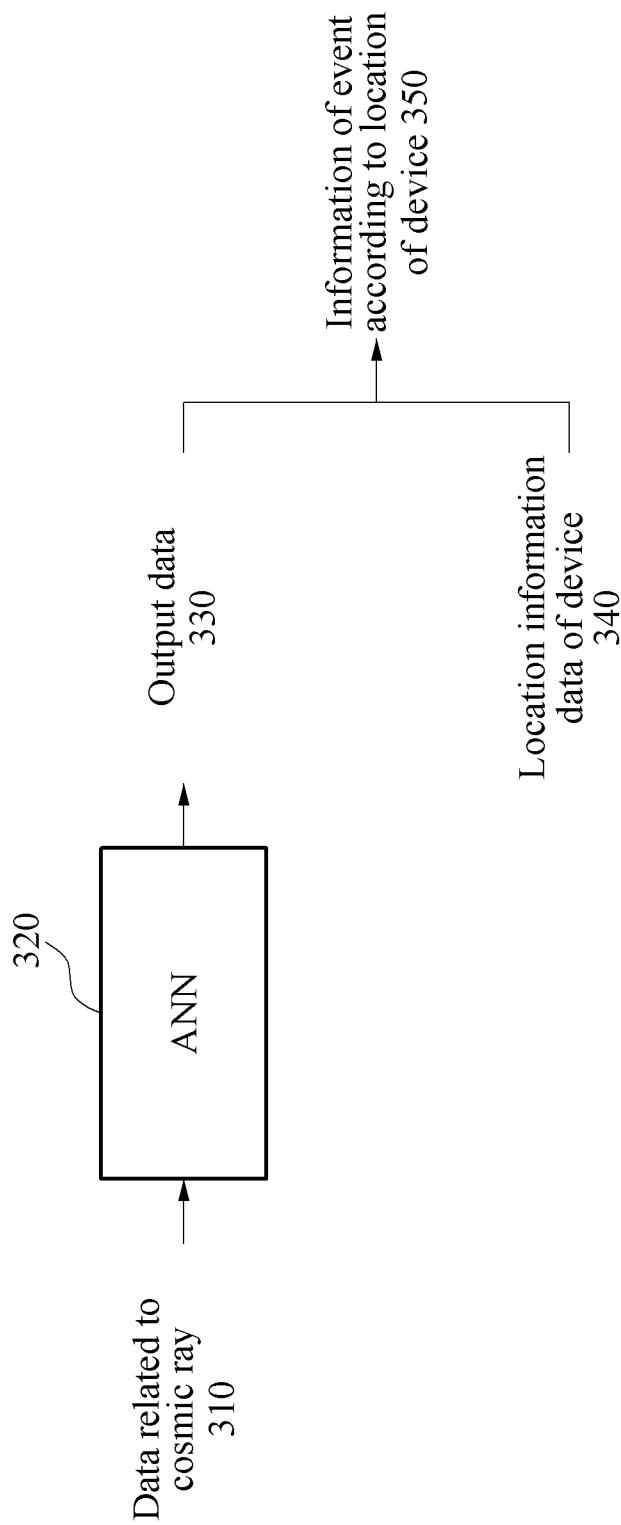
FIG. 3 illustrates an example of obtaining information about a cosmic ray event based on a location of a device, according to one or more embodiments.

FIG. 3 illustrates an example of obtaining information about a cosmic ray event based on a location of a device, according to one or more embodiments. Referring to FIG. 3, an artificial neural network (ANN) 320 may receive data 310 related to a cosmic ray (e.g., observational data) and produce output data 330.

The ANN 320 may include an input layer, a hidden layer, and an output layer. Each layer may include a plurality of nodes, and nodes between adjacent layers may be connected to each other with connection weights. Each node may operate based on an activation model. An output value corresponding to an input value may be determined according to the activation model. An output value of an arbitrary node may be input to a node of a next layer connected to the node. The node of the next layer may receive values output from a plurality of previous-layer nodes. A connection weight may be applied in a process in which the output value of the arbitrary node is input to the node of the next layer. The node of the next layer may output its output value (corresponding its input value) to the node of the next layer connected to the corresponding node, based on the activation model. The output layer may include nodes corresponding to a plurality of elements. Nodes of the output layer may output feature values corresponding to the plurality of elements.

A model parameter may be a parameter determined through learning, and may include, for example, a weight of a synaptic connection, or a bias of an artificial neuron. In addition, a hyperparameter may be a parameter that needs to be set before learning in a machine learning algorithm, and may include a learning rate, a number of repetitions, a mini-batch size, or an initialization function.

The purpose of learning of the ANN 320 may be to determine a model parameter that minimizes a loss function. The loss function may be used as an index to determine an optimal model parameter in a learning process of training an ANN.

The ANN 320 may be trained based on training data pairing cosmic ray data (e.g., a corona graph collected in real time) and event data (e.g., an amount of coronal mass ejection) corresponding to the training data. In detail, the ANN 320 may determine a difference between ground truth data and predicted output data as a loss function based on the training data related to the cosmic ray and determine a model parameter that minimizes the loss function.

An effect and time-to-arrive of an event may change according to the location of the device. In some examples, the output data 330 may be data in which the location of the device is not considered. However, the output data 330 may include cosmic ray predictions as a function of location, i.e., there may be different cosmic ray predictions for different locations.

The apparatus for enhancing device fault protection (or, a space activity analyzer, software module, cloud service, etc.) may obtain location information data 340 of the device and apply the location information data 340 to the output data 330 of the ANN 320 to derive information of the event data 350 according to (and specific to) the location of the device. For example, the information of the event data 350 may include energy level information, period information about a period during which a cosmic ray event occurs, and/or time-to-arrive information of a cosmic ray event according to the location of the device.

Figure 4A:
FIG. 4A illustrates an example operation of a device fault protection enhancing system, according to one or more embodiments.
Figure 4B:
FIG. 4B illustrates an example operation of a device fault protection enhancing system, according to one or more embodiments.

FIGS. 4A and 4B illustrate examples of an operation of a device fault protection enhancing system.

An apparatus for enhancing device fault protection may receive data related to a cosmic ray to directly predict information about an event or may receive information about an event from another entity (e.g., a space activity analyzer). In the following description, FIG. 4A illustrates an example of receiving information about an event from a space activity analyzer, and FIG. 4B illustrates an example in which the apparatus for enhancing device fault protection directly predicts information about an event. The description of FIGS. 1 through 3 may also apply to FIGS. 4A and 4B, and accordingly further description is not repeated herein.

Referring to FIG. 4A, an example of a device fault protection enhancing system may include an observatory 411, a space activity analyzer 412, a server 413 and a device 414.

The observatory 411 may obtain data related to cosmic rays by observing or sensing celestial activity including activity of the sun. For example, the observatory 411 may obtain a number of sunspots, corona graphs, or the like, via a camera, a satellite, or other type of sensor. It may be possible to predict the arrival of some particles (e.g., protons) from the arrival of lighter particles (e.g., electrons).

The space activity analyzer 412 may receive the data related to cosmic rays and predict information about an event that may occur by inputting the data related to the cosmic rays to an ANN. For example, the space activity analyzer 412 may predict an amount or intensity of cosmic rays coming from space based on the data related to the cosmic rays.

The server 413 may determine a soft error mitigation policy based on the information about the event and transfer the soft error mitigation policy to the target device 414. The server 413 may be, for example, the apparatus for enhancing device fault protection described above with reference to FIGS. 1 through 3.

Referring to FIG. 4B, a device fault protection enhancing system may include an observatory 421, a server 422, and a device 423, according to one or more embodiments.

The observatory 421 and the device 423 may operate in the same or similar manner as the observatory 411 and the device 414 of FIG. 4A, respectively. The server 422 may directly predict information about an event by receiving data related to cosmic rays from the observatory 421.

Figure 5:
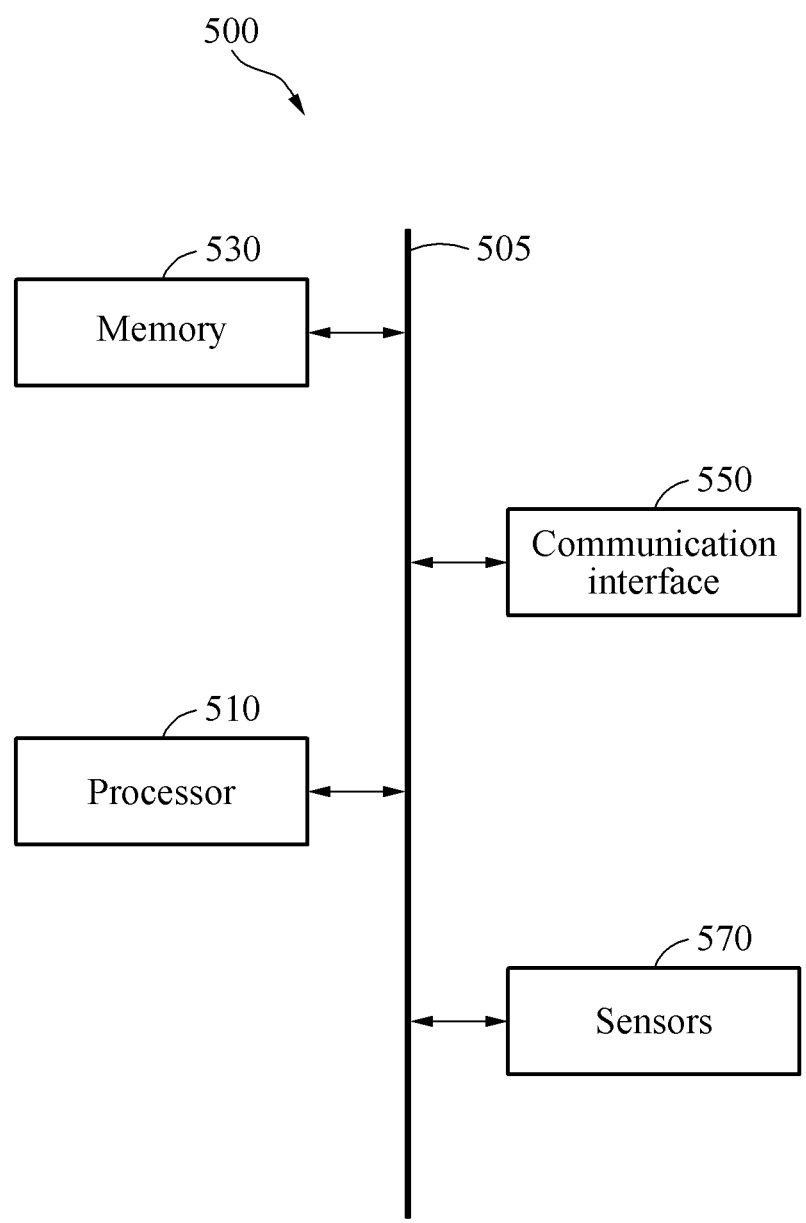
FIG. 5 illustrates an example of an apparatus for enhancing device fault protection, according to one or more embodiments.

FIG. 5 illustrates an example of an apparatus for enhancing device fault protection, according to one or more embodiments.

The apparatus for enhancing device fault protection may be referred to as an apparatus 500 for enhancing device fault protection for speaker recognition, because a registered voice may be secured during a speaker recognition operation.

Referring to FIG. 5, the apparatus 500 may include a processor 510. The apparatus 500 may further include a memory 530, a communication interface 550, and sensors 570. The processor 510, the memory 530, the communication interface 550, and the sensors 570 may communicate with each other via a communication bus 505.

The processor 510 may obtain information about at least one event that may be caused by cosmic rays, determine a soft error mitigation policy based on the information about the event, and transfer the soft error mitigation policy to a device.

The memory 530 may store information about at least one event that may be caused by cosmic rays, and an MTBF table of a device. The memory 530 may be, for example, a volatile memory or a nonvolatile memory.

The sensors 570 may include, for example, a camera sensor or any other sensor capable of sensing data related to cosmic rays.

In addition, the processor 510 may execute instructions to perform at least one method described above with reference to FIGS. 1 through 4B or an algorithm corresponding to the at least one method. The processor 510 may execute a program (e.g., code and/or machine instructions) and control the apparatus 500. A code of the program executed by the processor 510 may be stored in the memory 530. The apparatus 500 may be connected to an external device (e.g., a PC or a network) via an input and/or output device (not shown) to exchange data with the external device. The apparatus 500 may be, or be mounted to or incorporated in, various computing devices and/or systems, for example, a smartphone, a tablet computer, a laptop computer, a desktop computer, a TV, a wearable device, a security system, a smart home system, or the like.

The computing apparatuses, the vehicles, the electronic devices, the satellites, the supercomputers, the processors, the memories, the sensors (image or otherwise), the vehicle/operation function hardware, the ADAS/AD systems, the displays, the information output system and hardware, the storage devices, and other apparatuses, devices, units, modules, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method comprising:
   obtaining cosmic ray information indicating at least one cosmic ray event;
   determining a soft error mitigation policy based on the cosmic ray information;
   accessing the soft error mitigation policy by a device; and
   based on the soft error mitigation policy, performing, by the device, a mitigation action that mitigates for soft errors related to the cosmic ray event,
   wherein the determining of the soft error mitigation policy comprises:
      receiving a first mean time between failure (MTBF) of the device; and
      generating a second MTBF of the device based on the cosmic ray information and the first MTBF; and
   wherein the mitigation action comprises performing a checkpoint of the device based on the second MTBF.

2. The method of claim 1, wherein the mitigation action further comprises modifying power supplied to the device based on the cosmic ray information.

3. The method of claim 1, wherein the mitigation action further comprises changing an operating mode of the device.

4. The method of claim 1, wherein the obtaining the cosmic ray information comprises:
   obtaining observation data obtained by a sensor, the observation data predictive of the cosmic ray event; and
   predicting the cosmic ray event by inputting the observation data to an artificial neural network (ANN).

5. The method of claim 4, wherein the predicting of the cosmic ray event comprises correcting or generating an output of the ANN based on location information of the device and/or location information of the cosmic ray event.

6. The method of claim 4, wherein the predicting of the cosmic ray event comprises:
   predicting an energy, intensity, or flux level of the cosmic ray event according to the location information of the device; and
   predicting a time and/or duration of the cosmic ray event according to the location information of the device.

7. The method of claim 1, wherein the obtaining of the cosmic ray information comprises receiving the cosmic ray information via a network.

8. The method of claim 1, wherein the mitigation action comprises one or more of: performing a checkpoint, modifying power provided to or consumed by the device, altering hardware used by the device, or changing an operation mode of the device.

9. The method of claim 1, wherein the cosmic ray information is based on cosmic ray data obtained by sensing particles or electromagnetic radiation from Space, and wherein the particles or electromagnetic radiation are associated with the cosmic ray event.

10. A non-transitory computer-readable storage medium storing instructions that, when executed by a processor, cause the processor to perform the method of claim 1.

11. An apparatus comprising:
    a processor configured to
       obtain information about a predicted cosmic ray event, determine a soft error mitigation policy based on the predicted cosmic ray event, configure a device to perform a mitigation action based on the soft error mitigation policy, generate a second mean time between failure (MTBF) based on a first MTBF of the device and based on the information about the predicted cosmic ray event, and determine a checkpoint cycle of the device based on the second MTBF.

12. The apparatus of claim 11, wherein the processor is further configured to modify a voltage supplied to or consumed by the device based on the information about the predicted cosmic ray event.

13. The apparatus of claim 11, wherein the processor is further configured to determine an operating mode of the device based on the information about the predicted cosmic ray event.

14. The apparatus of claim 11, wherein the processor is further configured to obtain observational data related to the predicted cosmic ray event and generate the information about the predicted cosmic ray event by inputting the observational data to an artificial neural network (ANN).

15. The apparatus of claim 14, wherein the processor is further configured to modify an output of the ANN based on location information of the device.

16. The apparatus of claim 14, wherein the processor is further configured to predict an energy, intensity, or flux level of the predicted cosmic ray event according to a location of the device, predict a duration of the predicted cosmic ray event according to the location of the device, and predict a time-to-arrive of the event according to the location of the device.

17. The apparatus of claim 11, wherein the processor is further configured to receive the information about the predicted cosmic ray event.

18. A method performed by one or more computing devices, the method comprising:

receiving a geographic map of cosmic ray data obtained based on sensing particles or electromagnetic radiation from Space, wherein the particles or electromagnetic radiation are associated with a future cosmic ray event, and wherein the geographic map maps geographic locations to respective information items about the cosmic ray event;

determining a mitigation action based on the cosmic ray data; and implementing, by at least one of the one or more computing devices, the mitigation action.

19. The method of claim 18, further comprising selecting an information item about the cosmic ray event based on a geographic location of the one or more computing devices and determining the mitigation action based on the information item.

20. The method of claim 19, wherein the information item about the cosmic ray event comprises a predicted timing, location, duration, and/or intensity of the cosmic ray event with respect to at least one of the computing devices.

21. The method of claim 19, further comprising generating the map by a neural network performing an inference based on sensor data related to the cosmic ray event.

22. The method of claim 18, further comprising determining a timing and/or duration of the mitigation action based on the information item and performing the mitigation action according to the timing and/or duration of the mitigation action.

23. The method of claim 18, wherein the determining the mitigation action is further based on a geographic location of the at least one of the computing devices.

24. The method of claim 18, wherein the receiving and determining are performed by the at least one of the one or more computing devices.

25. The method of claim 18, wherein the at least one of the one or more computing devices comprises a satellite.

* * * * *